United States Patent [19]
Gutgold et al.

[11] Patent Number: 6,026,503
[45] Date of Patent: Feb. 15, 2000

[54] DEVICE AND METHOD FOR DEBUGGING SYSTEMS CONTROLLED BY MICROPROCESSORS

[75] Inventors: Simcha Gutgold, Raanana; Menachem Honig, Efrat; Vitaly Rubinovich, Rechovot; Ron Treves, Rechovot; Matias Veisman, Rechovot; Michael Wohlfarth, Maale Adumim, all of Israel

[73] Assignee: Telrad Communication and Electronic Industries Ltd., Lod, Israel

[21] Appl. No.: 08/909,817

[22] Filed: Aug. 12, 1997

[51] Int. Cl.⁷ ...................................................... G06F 11/00
[52] U.S. Cl. ................................................. 714/45; 714/47
[58] Field of Search ........................ 395/183.14, 184.01, 395/55.1, 575, 183.04, 183.21; 714/25, 28, 34, 38, 45, 47

[56] References Cited

U.S. PATENT DOCUMENTS

| | | |
|---|---|---|
| 4,692,897 | 9/1987 | Crabbe, Jr. . |
| 5,357,628 | 10/1994 | Yuen ......................................... 714/34 |
| 5,491,793 | 2/1996 | Somasundaram et al. ............... 714/45 |
| 5,526,485 | 6/1996 | Brodsky ................................... 714/38 |
| 5,608,867 | 3/1997 | Ishihara .................................... 714/47 |
| 5,805,792 | 9/1998 | Swoboda et al. ........................ 714/28 |
| 5,812,830 | 9/1998 | Naaseh-Shahry et al. ............... 714/25 |

FOREIGN PATENT DOCUMENTS 455 946 A2  2/1991  European Pat. Off. .

*Primary Examiner*—Joseph E. Palys
*Assistant Examiner*—Nguyen Xuan Nguyen
*Attorney, Agent, or Firm*—Mark M. Friedman

[57] ABSTRACT

A device and method for interactively debugging a system controlled by a microprocessor. The device continuously monitors the signals passed along the system bus, watching for signals that match interactively defined break conditions and trace conditions. When a breakpoint condition is satisfied, the device causes the system's microprocessor to execute debug code, which either may mediate interactive control of the system by the user or may initiate the execution of a software patch. When a trace condition is satisfied, the device initiates tracing of bus activity. The device is controlled by the user using conventional interactive interface means such as a video terminal or a personal computer.

23 Claims, 3 Drawing Sheets

DEVICE AND METHOD FOR DEBUGGING
SYSTEMS CONTROLLED BY
MICROPROCESSORS

FIELD AND BACKGROUND OF THE INVENTION

The present invention relates to a device and method for debugging systems that are controlled by microprocessors, and, more particularly, to a device and method for interactive debugging of systems used in embedded applications.

A wide variety of methods and systems is available for the interactive debugging of most application software for programmable computers. Modern compilers typically include facilities for compiling and linking source code in "debug mode", in which the compilers and linkers produce executable code that can be run interactively. Debugging facilities for testing such code typically enable programmers to set break conditions, to inspect and modify the values of program variables, and to add patches to the code.

Despite the superficial similarity between programmable computers, on the one hand, and systems such as fax machines that are controlled by microprocessors, on the other—both operate under the control of microprocessors that execute stored programs—the software-based debugging facilities that are available for systems controlled by microprocessors are far less flexible than those available for programmable computers. In a programmable computer, which stores its executable code in RAM, the "debug-mode" executable code is created from the source code by a separate debugging program that compiles the source code and replaces the operational code in RAM with the debug-mode code. The user is able to stop the execution of the debug-mode code and modify the debug-mode code at will. In a microprocessor-controlled system, however, the debug-mode code usually is included in the executable code along with the operational code. This executable code often is stored in read-only memory, for example, flash memory or EEPROM, and cannot be modified easily. Furthermore, debug-mode code typically runs slower than operational code. This makes it difficult to reproduce some bugs of real-time systems: a timing conflict that arises in the system when it is operated using relatively fast operational code may not arise when the system is operated using relatively slow debug-mode code.

If the system's microprocessor has a trace mode, the system can be run interactively without a need for debug-mode code accompanying the operational code. If the trace mode is enabled, then, after every step or branch of the operational program, a debug routine is called. This, however, typically is even slower than running debug-mode code, and therefore is even less suitable for debugging real-time systems.

A partial, hardware-based solution to this problem is provided by processor emulators. These are special-purpose computers that emulate the system microprocessors. A processor emulator is plugged into the system's circuit board in place of the microprocessor. The system then can be operated normally, except that the processor emulator, being a true computer and not just a microprocessor, allows monitoring in detail, and in real time, of the actions of the emulated microprocessor.

Processor emulators suffer from certain drawbacks not present in software-based debugging facilities. Processor emulators typically are not as flexible as software-based debugging facilities. One example of this inflexibility is that, because a processor emulator only tracks the current state of the system bus, it cannot monitor as wide a variety of conditions as a software-based debugger. In particular, a processor emulator cannot monitor logical conditions, i.e., conditions that depend on earlier events rather than on the current state of the bus. For example, a processor emulator cannot perform an action like starting a bus trace conditional on the value that was stored some time in the past in a location in memory, as opposed of a value that is being presently stored and therefore is present on the bus. A processor emulator also has no access to the contents of internal registers. Processor emulators cannot be used easily with circuit boards based on surface-mounted technology, in which the system microprocessor cannot be unplugged. A processor emulator typically is specific to a particular version of a microprocessor running at a particular clock rate, and cannot be used to emulate a different version of the same microprocessor running at a different rate. Finally, processor emulators are expensive, and there is no commonly accepted standard for their design and use.

There is thus a widely recognized need for, and it would be highly advantageous to have, a device and method for interactively debugging microprocessor-operated systems that combines facilities more similar to those available for the software-based debugging of application programs for programmable computers with those available using processor emulators.

SUMMARY OF THE INVENTION

According to the present invention there is provided a device for monitoring a system of components that communicate via at least one signal on a bus, one of the components being a microprocessor that controls the system, the device including: (a) at least one processor interface deployed so as to monitor the at least one signal on the bus; and (b) a condition tester communicating with the at least one processor interface and including a condition block; the processor interface being configured to allow direct communication between the microprocessor and the condition block.

According to the present invention there is provided a method for debugging a system controlled by a microprocessor, the system including at least one memory containing data stored at a range of data addresses and code stored at a range of code addresses, the code including operational code, the operational code including at least one instruction, the microprocessor and the at least one memory communicating via a plurality of bus signals on a bus, at least one of the plurality of bus signals including at least one bus signal address field, at least one of the plurality of bus signals including at least one bus signal data field, the microprocessor executing at least part of the code, the microprocessor including at least one microprocessor register containing a value, the method including the steps of: (a) defining a first break condition; (b) monitoring the bus signals; (c) comparing each of the bus signals to the first break condition; and (d) if one of the bus signals matches the first break condition: indicating that a match has occurred.

According to the present invention there is provided a method for debugging a system containing components including a microprocessor and a memory, the components communicating via at least one signal on a bus, the method including the steps of: (a) defining a trace start condition; (b) providing a trace register block having a certain capacity; (c) monitoring the at least one signal; (d) comparing the at least one signal to the trace start condition; and (e) contingent on the comparison, storing in the trace register block at least one trace record including a data item, an address, a read/write indication, a function code, and an IRQ state.

The architecture of a microprocessor-operated system is shown schematically in FIG. 1. A microprocessor 1 communicates with, and controls, the other functional units of the system via a bus 2. The other functional units may include a RAM 3, a ROM 4 (for example, a flash memory), and the functional units that perform the actual work of the system, referred to here collectively as i/o devices 5. The operation of the system is done through the exchange of signals, including addresses, instructions, and data, along bus 2. Microprocessor 1 fetches executable instructions from memory (RAM 3 or ROM 4) by sending the addresses of the instructions to memory, which sends the instructions back to microprocessor 1. Microprocessor 1 reads data from memory by sending the addresses of the data to memory, which sends the data back to microprocessor 1. Microprocessor 1 writes data to memory by sending the data and the associated addresses to memory. Microprocessor 1 drives i/o devices 5 by a similar exchange of instructions, addresses, and data.

The device of the present invention monitors this exchange of signals along bus 2 by using one or more processor interfaces (PIF) attached to bus 2. Each PIF is specific to a particular type of microprocessor. The PIFs also provide handshake, timing and arbitration during microprocessor read/write access to the internal registers of the device, and include memory selection and interrupt logic. It is the latter features of the PIFs of the present invention, particularly the handshake protocol, which allow microprocessor 1 to communicate directly with the registers of the present invention, that distinguishes the present invention from a processor emulator.

The device of the present invention also includes functional blocks: a condition tester (CT) and preferably also an interrupt control and functionality specifier (ICFS). The CT includes a set of condition register blocks that contain descriptions of the conditions under which the device of the present invention intervenes in the operation of the system. The ICFS includes registers for managing the device of the present invention. Among these registers, in preferred embodiments of the present invention, are several trace registers, for managing the intervention of the device of the present invention in the operation of the system, and several interrupt control registers, for specifying when interrupts will be issued to the microprocessor.

The CT continuously compares the signals monitored by the PIF on bus 2 with the descriptions stored in the condition register block. When a match is found, the CT signals that fact to the ICFS, which initiates activities such as:

1. Entry into interactive debug mode. The ICFS sends an indication to microprocessor 1, instructing microprocessor 1 to suspend operation of the regular code of the system and to enter debug mode. The system's debug-mode code now can be used to respond to user commands to, for example, read the data stored in RAM 3, write new data to RAM 3, disassemble executable instructions stored in ROM 4, to switch tracing on and off, or to perform other tasks associated with debugging the system.

2. Tracepoint. The ICFS sends an indication to microprocessor 1, instructing microprocessor 1 to suspend operation of the regular code of the system and to enter debug mode. The debug code now performs actions that have been scheduled in advance, rather than being initiated interactively by the user. Examples include the display of the contents of memory registers or portions of the stack, and switching tracing on and off, followed by automatic continuation of execution of regular code.

3. Software patch. The ICFS sends an interrupt signal to microprocessor 1, instructing microprocessor 1 to suspend operation of the regular code of the system and enter debug mode. Debug mode code then can execute patch code. At the end of the execution of the patch code, execution of the system's regular code can be resumed.

4. Enable, perform or disable tracing. Preferred embodiments of the device of the present invention include a trace buffer. The ICFS records the signals monitored by the PIF, preferably along with timestamps, in the trace buffer.

The indication sent by the ICFS to microprocessor 1 may be an interrupt signal or a trap instruction; or the ICFS may set a register that can be polled by the operational code of the system.

The condition that initiates entry to debug mode or the execution of a software patch is called a "break" condition. The condition that specifies when to start tracing, when to stop tracing, and what to store in the trace buffer, is called a "trace" condition. The conditions that initiate and terminate tracing may include preset numbers of bus cycles, preset numbers of memory accesses, and accesses of specific types of memory space, or any other condition that can be detected by microprocessor 1.

Because of the low level at which the device of the present invention operates, compared to the relatively high level of operation of conventional software-level debugging, the conditions monitored by the device of the present invention include conditions not available to conventional software-level debugging, including monitoring for attempted access to addresses outside the address space of memory, as well as for attempted access to addresses within the address space of memory that should not be accessed. In addition, software conditions that are unavailable to processor emulators may be monitored. For example, microprocessor 1 may be instructed to enter into interactive debug mode, execute a tracepoint, and/or execute a software patch, contingent on a certain value being stored at a certain address in memory or in a register of microprocessor 1.

If the system is provided with a debug monitor, that debug monitor may be used to control the device of the present invention. Preferably, the device of the present invention is provided with a serial link interface to offer the user the option of controlling the device of the present invention using a conventional interactive means such as a video terminal or a personal computer. This serial link interface includes several registers needed for communication with the interface means. If the interface means is a video terminal, then the only debug-mode code available to the device of the present invention is the debug-mode code of the system. If the interface means is a programmable device such as a personal computer, then the interface means may provide source level debug code to supplement the inherent capabilities of the device of the present invention. Note that the debug-mode code of the system generally includes a serial communications protocol for communicating with an external programmable device, in which case this source level debug code must use the same communications protocol.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a device and method for debugging systems controlled by microprocessors. Specifically, the present invention can be used to debug a microprocessor-controlled system in a manner similar to that in which application software for computers can be debugged in "debug mode".

The principles and operation of a debugger according to the present invention may be better understood with reference to the drawings and the accompanying description.

Figure 1:
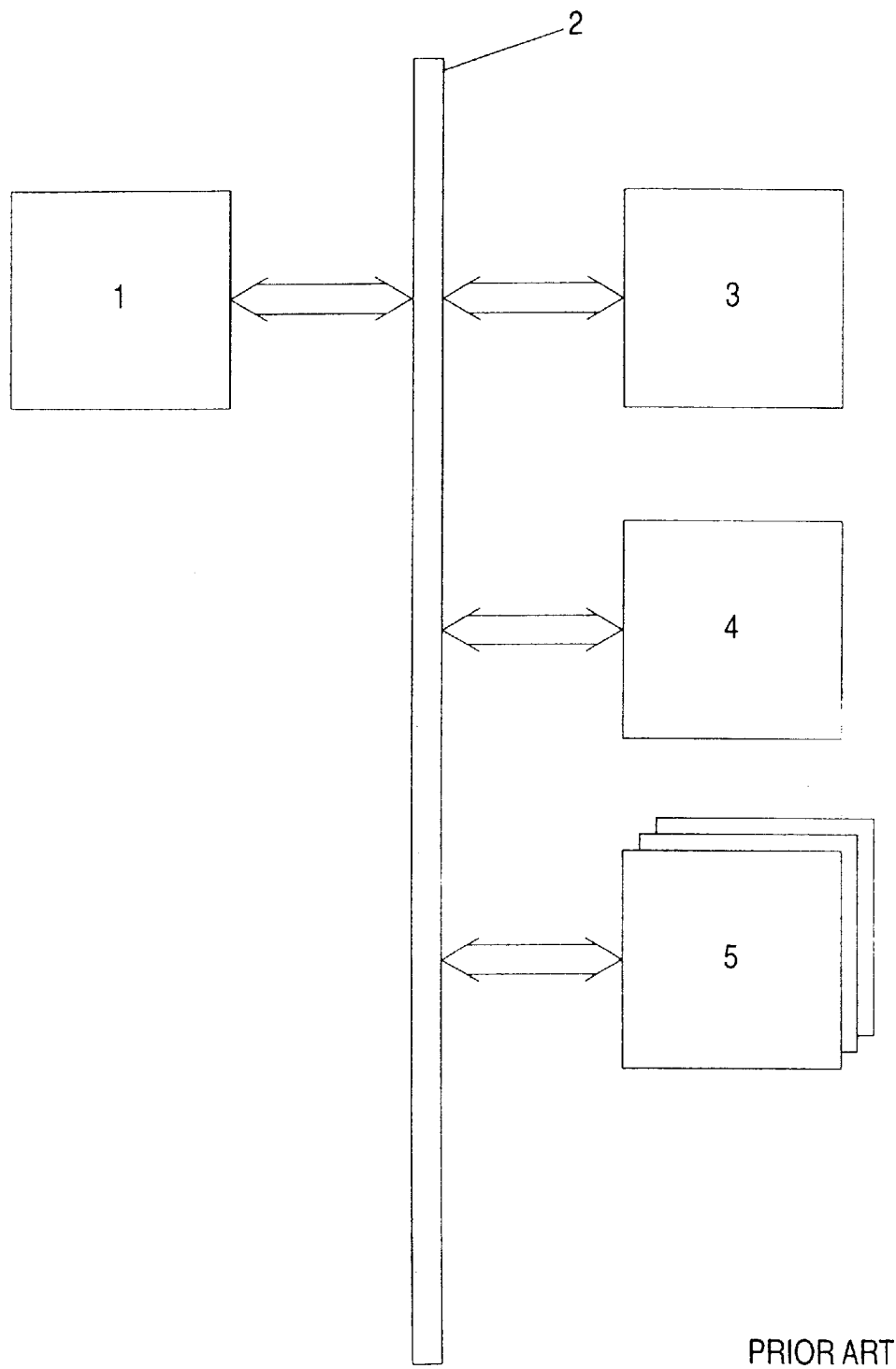
FIG. 1 (prior art) is a schematic diagram of the architecture of an system to be debugged with the help of the present invention.
Figure 2:
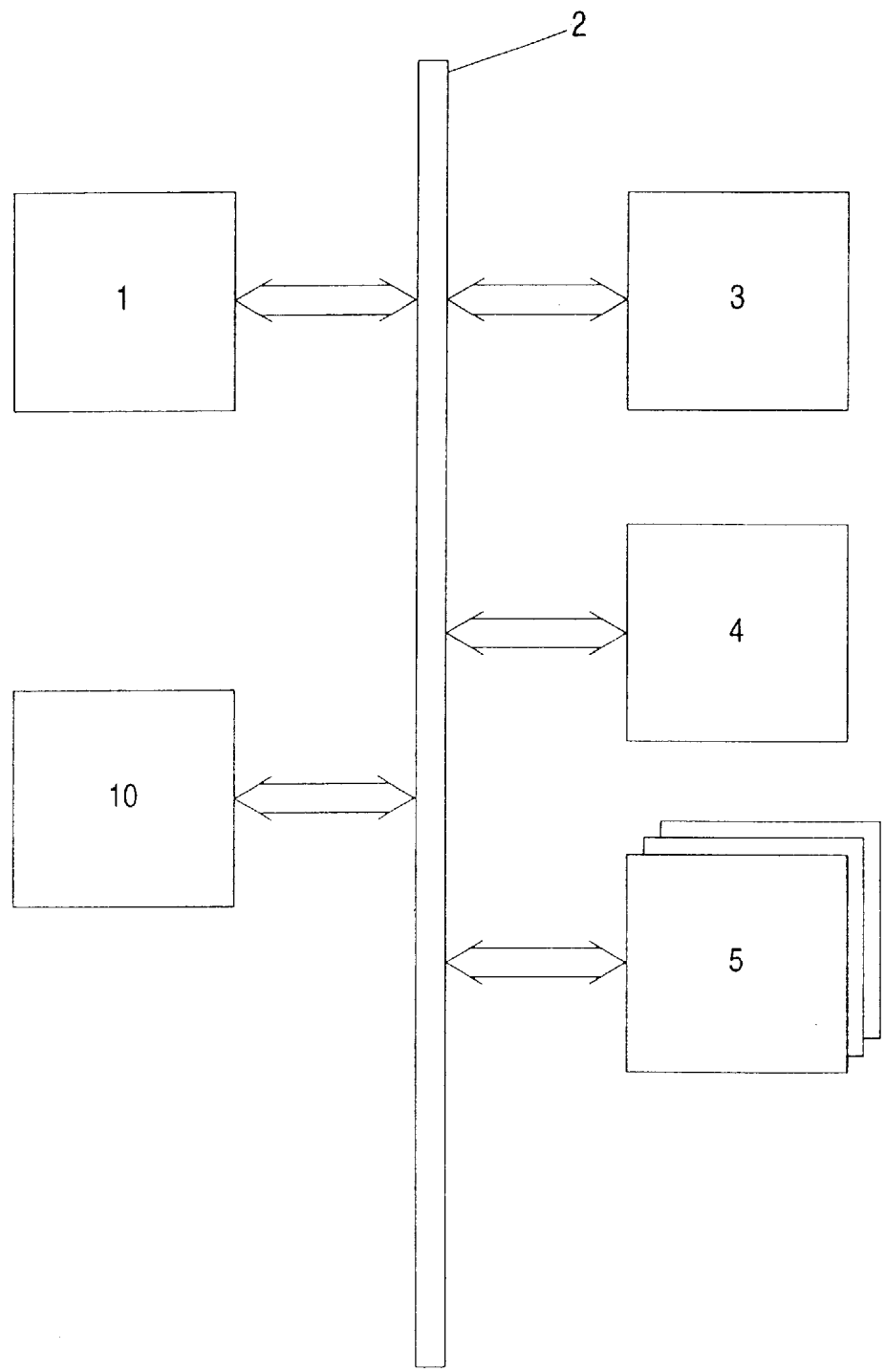
FIG. 2 is a schematic diagram of the architecture of the system of FIG. 1, including the device of the present invention.

Referring now to the drawings, FIG. 2 is the same as FIG. 1, except that a device of the present invention, a debugger 10, is included in the architecture of the system. Preferably, debugger 10 is fabricated on one or more ASIC chips.

Figure 3:
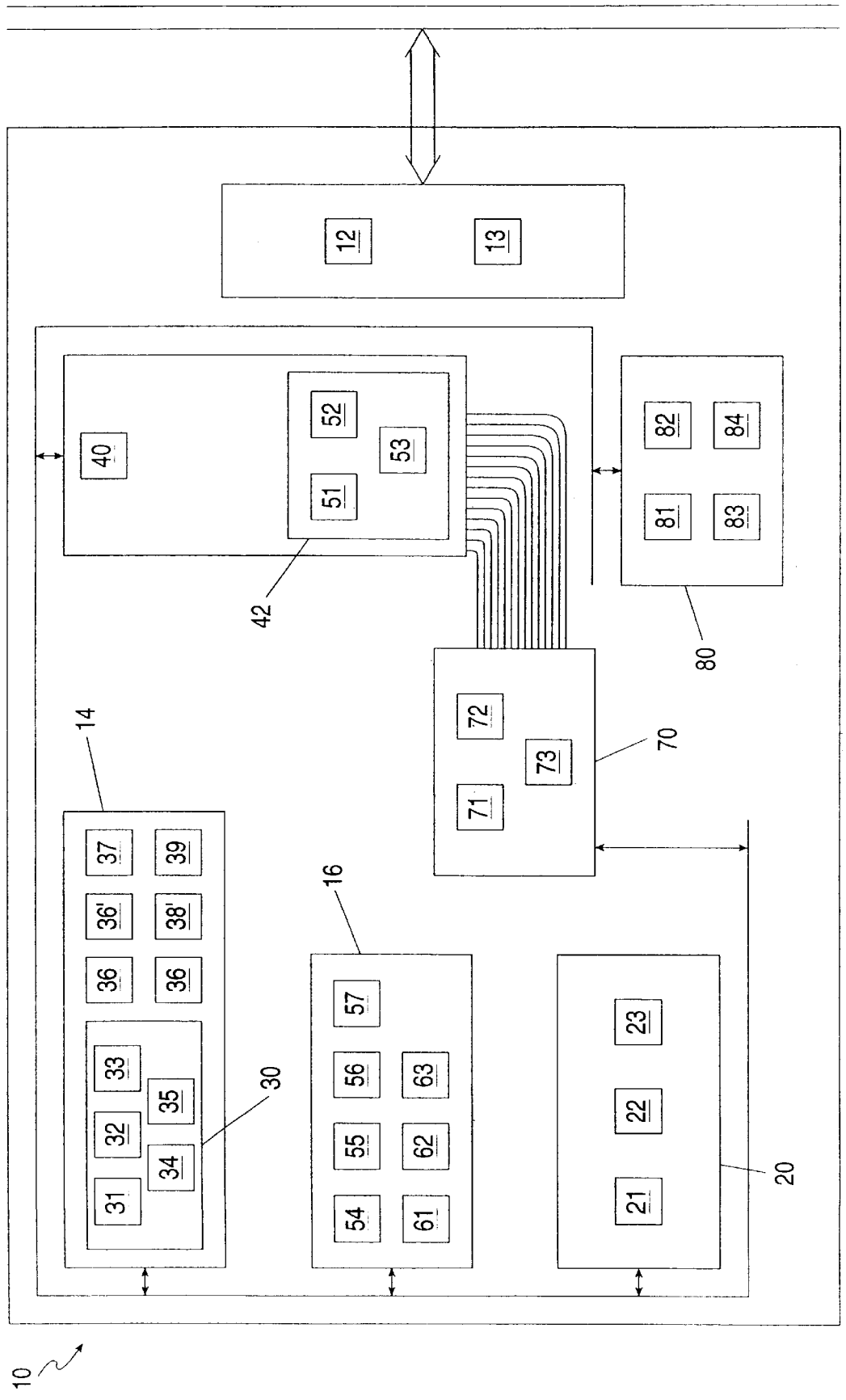
FIG. 3 is a schematic functional block diagram of the architecture of the present invention.

FIG. 3 is a partial schematic functional block diagram of the architecture of a preferred embodiment of debugger 10. The components shown in FIG. 3 are a PIF block 12, a CT 14, an ICFS 16, a trace register block (TRB) 40, a timestamp module (TSM) 70, a serial port interface (SI) 80, and a general control register (GCR) 20. Debugger 10 also requires other components (not shown) in order to function. Because the nature and purpose of these other components are not germane to the point of novelty of the present invention, and indeed are well-known to those skilled in the art, they will not be discussed further.

Although PIF block 12 may include several PIFs, debugger 10 then offering the user the option of selecting a PIF specific to a particular target microprocessor, in preferred embodiments of the device of the present invention, PIF block 12 includes only one PIF 13. As an illustrative example, PIF 13 may be specific to a Motorola 68302 microprocessor, but the scope of the present invention includes PIFs adapted to microprocessors of any family, not just Motorola microprocessors. The design and fabrication of PIF 13 is well-known in the art and therefore will not be elaborated.

General control register 20 includes a bus watch enable/disable (BW) bit 21, a trace enable/disable bit 22, and an external control enable/disable bit 23. BW bit 21 must be set for debugger 10 to monitor the signals on bus 2. When BW bit 21 is disabled, debugger 10 ignores the signals on bus 2, but all registers still are read/writable. Trace bit 22 must be set to enable writing to TRB 40. External control bit 23 must be set to enable control of debugger 10 by an external means, such as a personal computer, via SI 80.

CT 14 contains several (for example, eight) condition blocks 30, of which, for simplicity, only one is shown in FIG. 3. Condition block 30 includes an address register 31, an address mask register 32, a data register 33, a data mask register 34, and a status register 35, each of registers 31 through 35 being preferably 32 bits long. ICFS 16 compares signals on bus 2 with the contents of registers 31 through 35 to determine whether to issue an interrupt (break condition) or store trace information (trace condition). The bits set in address register 31 define the bits that must be set in the address field of the signal for initiation of a break condition or a trace condition. The bits set in address mask register 32 show which bits in the address field to ignore. The bits set in data register 33 define the bits that must be set in the data field of the signal for initiation of a break condition. The bits set in data mask register 34 show which bits in the address field to ignore. Status register 35 includes bits for enabling and disabling other criteria for initiating a break condition, for example, the counting of read and write cycles, and attempts at byte, word, or longword access in RAM 3. One bit of status register 35 is used for choosing a hardware or software interrupt, as defined below.

CT 14 also may contain other condition blocks (not shown) of limited capability. For example, one of the condition blocks may include an address register, and have a fixed status of "program read". An interrupt can be issued, based on this condition block, only in response to an attempt to read from an address stored in the address register of this condition block.

CT 14 also contains two address range registers 36 and 36', and two data range registers 38 and 38', all preferably 32 bits long, an address range flag 37, preferably one bit long, and a data range flag 39, also preferably one bit long. ICFS 16 compares the address field of the signal with the contents of address range registers 36 and 36' to test if the address field is within (if flag 37 is set) or outside (if flag 37 is not set) the bounds defined by the contents of registers 36 and 36'. Similarly, ICFS 16 compares the data field of the signal with the contents of data range registers 38 and 38' to test if the data field is within (if flag 39 is set) or outside (if flag 39 is not set) the bounds defined by the contents of registers 38 and 38'.

TRB 40 is a memory unit that is used to store records of activity on bus 2, first in first out, up to predefined depth, preferably at least 40 records. Each trace record may include the data being transmitted on bus 2, an indication of whether the data are being read or written, an indication of whether the memory access is a code access or a data access, the address that the data are read from or written to, the interrupt request state of the system, and a timestamp. TRB 40 also includes a trace record window 42 that contains three registers, an address bus contents register 51, a data bus contents register 52 and a control bus contents register 53, all preferably 32 bits long.

Registers 51 through 53 echo most aspects of the first record in TRB 40. Address bus contents register 51 contains a copy of the address field of the trace record. Data bus contents register 52 contains a copy of the data field of the trace record. Status bus contents register 53 includes the bits specified in status register 35, and preferably 14 bits for a timestamp and one "entry invalid" bit that indicates whether or not there are trace records in TRB 40. The preferred timestamp format is 10 bits of mantissa and 4 bits of exponent.

ICFS 16 includes eight registers: four for controlling the writing of trace records to TRB 40, and three for controlling interrupts. The four registers that control tracing are a trace start register 54, a trace stop register 55, a trace store register 56 and a trace control register 57. The three registers that control interrupts are an interrupt pending register 61, an interrupt mask register 62 and an interrupt status register 63. Registers 54 through 57 are preferably eight bits long. The lengths of registers 61 through 63 are discussed below.

Each bit of start trace register 54, if set, indicates that the corresponding one of the eight conditions defined in condition blocks 30 is to be a possible trace condition, to initiate tracing, and not a break condition. Conversely, each bit of stop trace register 55, if set, indicates that tracing is to be terminated if the corresponding condition is true. Store trace register 56 and trace control register 57 provide further control over tracing. Once the condition specified in start trace register 54 has been met, bus activity matching the condition specified in store trace register 56 is written to TRB 40. One bit of trace control register 57 is a global trace enabling/disabling bit: unless it is set, no tracing is allowed, regardless of the contents of start trace register 54 and store trace register 56. Two other bits of trace control register 57 are used to indicate what action to take when TRB 40 is full: continue writing, first-in first-out, thereby losing the earliest trace records; stop tracing, but otherwise proceed normally; or issue an interrupt. A fourth bit of trace control register 57 is used to indicate whether TRB 40 is empty.

Registers 61 through 63 have as many bits as there are possible interrupt (breakpoint) conditions: eight corresponding to condition blocks 30, one for the condition of TRB 40 being true, and as many as are needed for interrupts issued by an external means, such as a personal computer, via SI 80. When one of the interrupt conditions is satisfied, then, if bus watch bit 21 is set, the bit of interrupt pending register 61 corresponding to the interrupt status register 63 is set. If the corresponding bit of interrupt mask register 62 is set, then the interrupt is issued and the corresponding bit in interrupt status register 63 is set; otherwise, the interrupt is not issued and the corresponding bit in interrupt status register 63 is not set.

TSM 70 includes three registers for storing a representation of the time since the last entry in TRB 40, preferably in units of clock cycles: a mantissa counter 71, an exponent counter 72, and a time scale counter 73. This representation is written to the timestamp field of each trace record. In preferred embodiments of the device of the present invention, there are 14 parallel lines 75 from TSM 70 to TRB 40 so that all 14 bits of the representation of the current time can be moved simultaneously to TRB 40.

SI 80 contains four registers for communicating with an interface means: a serial in register 81, a serial out register 82, a serial status register 83 and a serial control register 84. Serial in register 81 and serial status register 83 are written to by the interface means and read by CPU 12. Serial out register 82 and serial control register 84 are written to by CPU 12 and read by the interface means. Serial in register 81 and serial out register 82 are as long as the words written and read by the interface means. Serial in register 81 contains the last word received from the interface means. Writing a word to serial out register 82 causes that word to be transmitted to the interface means. The bits of serial status register 83 are used by the interface means to indicate its status. These bits include an RxRDY/TxRDY (receive ready/transmit ready) bit, to indicate to CPU 12 that a new word is waiting to be read in serial in register 81, or that the interface means has received the word stored in serial out register 82. These bits, as well as the bits of serial control register 84, also include bits used in conjunction with communication with a programmable interface means.

At power-up, BW bit 21 is disabled, because there are as yet no breakpoint or tracepoint conditions defined in condition blocks 30. The user defines these conditions interactively, either via the debug port of the system being debugged, or via the interface means (if it is a programmable interface means such as a personal computer) connected to SI 80. The break/trace conditions defined in condition blocks 30 are hardware conditions. These hardware conditions include fetching data from a particular address in memory (RAM 3 or ROM 4), fetching a particular data value from memory, writing a particular data value to memory, fetching a particular instruction from memory, and particular types of memory access, for example, fetching a byte, a word, or a longword from memory. In addition, the software enables the combination of two or more hardware conditions into a logical condition that is equivalent to a range of hardware conditions. Other logical conditions include the contents of microprocessor registers of microprocessor 1 and of locations in memory, both separately and in combination with hardware conditions, as well as the occurrences of specific numbers of hardware conditions, for example, a specific number of read or write accesses of a particular address in memory. In general, logical conditions also include any condition that can be detected by microprocessor 1.

The interrupt issued by ICFS 16 at a break condition may be either a hardware interrupt or a software interrupt. The hardware interrupt is asynchronous: ICFS 16 issues an interrupt request that suspends the normal operation of microprocessor 1 immediately and causes microprocessor 1 to start executing debug-mode code. The software interrupt is synchronous: at the next instruction fetch cycle, ICFS 16 sends to bus 2 a signal that contains a special operation code.

One example of a particularly useful software interrupt is a "trap". A trap is an instruction that is useful in dealing with the fact that if microprocessor 1 prefetches instructions from memory (typically but not necessarily from ROM 4), and if the instruction address that triggers a break condition is the instruction immediately after a branch instruction, then a hardware interrupt issued upon recognition of that instruction address may be inappropriate, because microprocessor 1 might branch around that instruction. To deal with this problem, the first time ICFS 16 recognizes an attempt by microprocessor 1 to fetch a command from ROM 4 whose address matches a break condition, ICFS 16 issues a retry signal to microprocessor 1, puts a trap instruction on bus 2, and temporarily disables access to memory. The retry signal instructs microprocessor 1 to repeat the last operation and read the trap that was put on bus 2. Thus, if the instruction that matches the break condition is preceded immediately by a branch instruction, microprocessor 1 executes the branch instruction and does not execute the prefetched trap instruction. Only if the branch was not taken does microprocessor 1 try to execute the instruction that matches the break condition, and only then, when microprocessor 1 executes the prefetched trap instruction, does microprocessor 1 execute the trap handler, allowing entry into debug mode as if a hardware interrupt had occurred. In addition, an interface means such as a video terminal or a personal computer may signal device 10 to issue hardware interrupts of its own. Alternatively, the system's operational code can periodically read interrupt pending register 61 and jump into debug-mode code if an interrupt condition has been set.

In debug mode, all regular activities of the system may be suspended. The conditions defined in condition block 30 are disabled by setting BW bit 21, and tracing is disabled, preferably by disabling trace enable/disable bit 22. The following activities may be scheduled in advance to be performed by the debug mode code, or may be performed interactively by the user under software control:

Display or set the value in a memory location.

Display or set the value in a register of microprocessor 1.

Disassembling some of the executable code stored in memory.

Display or set the value in one of the registers of device 10.

Defining break conditions, tracepoint conditions, trace conditions and software patches.

Executing a software patch.

Displaying the contents of TRB 40.

Starting or stopping a trace.

Executing the instruction, or the set of instructions (up to the next branch) that would have been executed next by microprocessor 1 if not for the interrupt, and then returning to debug mode.

Resuming execution until the next breakpoint.

Enabling control of the system, via debugger 10, by a programmable interface means.

As noted above, the programmable interface means may include additional debug code. Illustrative examples of debug code software packages that may be used in conjunction with the present invention include any commercial package that works with the BDM (Background Debug Mode) code found on the Motorola 68360 processor, for example the EMUL16/300-PC/BDM package produced by Nohau Corp. of Campbell, Calif.

Most preferably, on the occurrence of a break condition, in addition to or instead of issuing an interrupt, ICFS 16 may initiate a "trigger out" condition, in which a signal is sent by debugger 10 to another device. In the preferred embodiment in which debugger 10 is fabricated on one or more ASIC chips, this signal is implemented by setting a pin of one of the chips to either a high state from a low state or to a low state from a high state. Correspondingly, a "trigger in" condition, i.e., the setting of a pin to a high state from a low state or to a low state to a high state by an external device, may be one of the break conditions or trace conditions set in the registers of one or more condition blocks 30.

On occurrence of a trace condition, the contents of the bus signal, including the data or executable code being transferred, the address being accessed, whether the access is a read or a write, and the IRQ state are written, as a trace record, to TRB 40, along with a timestamp from TSM 70. The writing of trace records to TRB 40 is contingent on the contents of start trace register 54, stop trace register 55, and store trace register 56, as described above. The timestamp as stored is relative to the previous entry in TRB 40, but timestamps may be displayed either in relative format or in absolute format. Preferably, the timestamp represents numbers of clock cycles, with an accuracy of three significant decimal figures. To this end, control bus contents register 53 includes 10 bits for a mantissa and 4 bits for an exponent.

If as many trace records have been written to TRB 40 as TRB 40 can contain, TRB 40 signals that fact to ICFS 16, which sends an indication thereof to microprocessor 1, instructing microprocessor 1 to suspend operation of regular system code and to enter debug mode.

While the invention has been described with respect to a limited number of embodiments, it will be appreciated that many variations, modifications and other applications of the invention may be made.

What is claimed is:

1. A device for monitoring a system of components that communicate via at least one signal on a bus, one of the components being a microprocessor that controls the system, the device comprising:

(a) at least one processor interface deployed so as to monitor the at least one signal on the bus; and (b) a condition tester communicating with said at least one processor interface and including a condition block;

said processor interface being configured to allow direct communication between the microprocessor and said condition block.

2. The device of claim 1, wherein said condition block includes at least one register selected from the group consisting of:

(i) an address register;
    (ii) an address mask register;
    (iii) a data register;
    (iv) a data mask register; and
    (v) a status register.

3. The device of claim 1, further comprising:

(c) an interrupt control and functionality specifier, communicating with said condition tester and said at least one processor interface.

4. The device of claim 3, wherein said interrupt control and functionality specifier includes at least one register selected from the group consisting of:

(i) a trace start register;
    (ii) a trace stop register; and
    (iii) a trace store register.

5. The device of claim 3, wherein said interrupt control and functionality specifier includes at least one register selected from the group consisting of:

(i) an interrupt pending register;
    (ii) an interrupt mask register;
    (iii) an interrupt status register; and
    (iv) an interrupt vector register.

6. The device of claim 1, further comprising:

(d) a trace register block, communicating with said interrupt control and functionality specifier and with said at least one processor interface.

7. The device of claim 1, further comprising:

(d) a general control register including a bus watch bit.

8. The device of claim 1, further comprising:

(d) a timestamp module, in communication with said trace register block.

9. The device of claim 1, further including:

(d) a serial port interface.

10. The device of claim 9, wherein said serial port interface includes at least one register selected from the group consisting of:

(i) a serial in register;
    (ii) a serial out register;
    (iii) a serial status register; and
    (iv) a serial control register.

11. A method for debugging a system controlled by a microprocessor, the system including at least one memory containing data stored at a range of data addresses and code stored at a range of code addresses, the code including operational code, the operational code including at least one instruction, the microprocessor and the at least one memory communicating via a plurality of bus signals on a bus, at least one of said plurality of bus signals including at least one bus signal address field, at least one of said plurality of bus signals including at least one bus signal data field, the microprocessor executing at least part of the code, the microprocessor including at least one microprocessor register containing a value, the method comprising the steps of:

(a) defining a first break condition;
    (b) monitoring the bus signals;
    (c) comparing each of the bus signals to said first break condition; and
    (d) if one of the bus signals matches said first break condition: issuing a retry signal to the microprocessor and then placing a trap instruction on the bus.

12. The method of claim 11, further comprising the step of:

(e) providing a register to indicate that said match has occurred;

and wherein said indicating that said match has occurred is effected by setting said register.

13. The method of claim 11, further comprising the step of:
   (e) if one of the bus signals matches said first break condition: performing at least one action selected from the list consisting of:
      (i) displaying at least a portion of the data contained in the at least one memory,
      (ii) setting at least a portion of the data contained in the at least one memory,
      (iii) displaying at least a portion of the value contained in at least one of the at least one microprocessor register,
      (iv) setting at least a portion of the value contained in at least one of the at least one microprocessor register,
      (v) disassembling at least a portion of the code contained in the at least one memory,
      (vi) defining a break condition,
      (vii) defining a tracepoint condition,
      (viii) defining a software patch,
      (ix) defining a trace condition,
      (x) executing a software patch,
      (xi) displaying a record of at least one other of the bus signals,
      (xii) starting a trace,
      (xiii) stopping a trace,
      (xiv) executing at least one instruction of the operational code, and
      (xv) resuming the execution of the operational code by the microprocessor.

14. The method of claim 13, wherein said at least one action is scheduled in advance to be performed by the microprocessor.

15. The method of claim 13, wherein said at least one action is performed interactively under user control.

16. The method of claim 13, further comprising the step of:
   (f) checking a logical condition, said performing of said at least one action being contingent on said logical condition.

17. The method of claim 16, wherein said logical condition includes a value stored in a location selected from the group consisting of the memory and the at least one register of the microprocessor.

18. The method of claim 11, further comprising the step of:
   if one of said bus signals matches said first break condition:
      (e) enabling control by a programmable interface means.

19. The method of claim 11, wherein at least part of said first break condition is that the bus signal address field be outside a certain address range.

20. The method of claim 11, wherein at least part of said first break condition is that the bus signal address field be within a certain address range.

21. The method of claim 11, wherein at least part of said first break condition is that the bus signal data field be outside a certain data range.

22. The method of claim 11, wherein at least part of said first break condition is that the bus signal data field be within a certain data range.

23. A device for monitoring a system of components that communicate via at least one signal on a bus, one of the components being a microprocessor that controls the system, the microprocessor being selected from among a plurality of microprocessors of different types, the device comprising:
   (a) a plurality of processor interfaces deployed so as to monitor the at least one signal on the bus, each said processor interface being specific to a different type of processor; and
   (b) a condition tester communicating with said processor interfaces and including a condition block;
   each of said processor interfaces being configured to allow direct communication between the respective microprocessor and said condition block.

* * * * *